June 2, 1953  J. S. GARNER  2,640,291
FISHHOOK
Filed May 23, 1952

John S. Garner
INVENTOR

BY *CA Snowles*
ATTORNEYS.

Patented June 2, 1953

2,640,291

UNITED STATES PATENT OFFICE 2,640,291

FISHHOOK

John S. Garner, Darlington, S. C.

Application May 23, 1952, Serial No. 289,580

2 Claims. (Cl. 43—37)

This invention relates to fish hook construction, the primary object of the invention being to provide a fish hook wherein an auxiliary hook is slidably mounted on the shank thereof, the hooks being connected to the fishing line in such a way that the prong ends of the hooks will normally remain separated, but will move to embed themselves in the flesh of the fish when the fishing line is suddenly jerked or pulled by the fisherman to snag the fish.

Another important object of the invention is to provide a fish hook with a substantially long shank over which the sleeve carrying the auxiliary hook slides, the connection between the sleeve and shank of the main fish hook being such that the sleeve with its hook will be normally held against movement longitudinally of the shank of the main fish hook.

Still another object of the invention is to provide a fish hook wherein the auxiliary hook thereof will normally be held in a position remote from the prong of the main hook to avoid interference as the fish attempts to remove the bait from the hook.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing.

Figure 1:
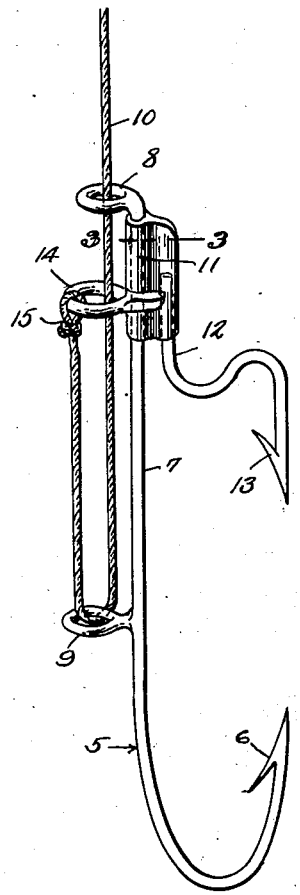
Figure 1 is a side elevational view of a fish hook constructed in accordance with the invention, illustrating the prongs of the hook as separated.
Figure 2:
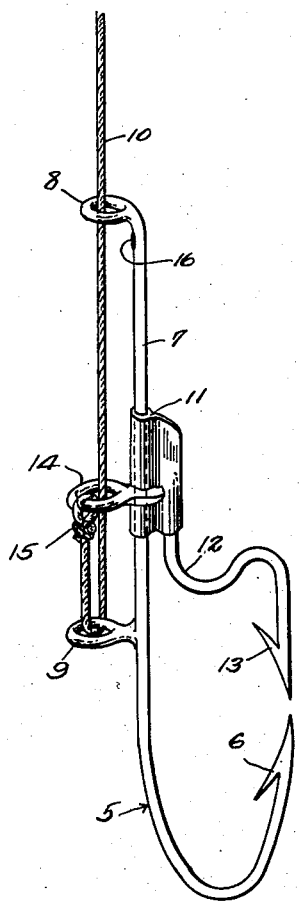
Fig. 2 is a side elevational view illustrating the location of the prongs of the fish hook when moved to their active positions.
Figure 3:
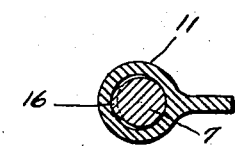
Fig. 3 is a sectional view taken on line 3—3 of Fig. 1.

Referring to the drawing in detail, the main hook section is indicated generally by the reference character 5 and is provided with the usual prong or barb 6. The shank of the main hook section is indicated by the reference character 7 and is substantially long with the laterally extended eye 8 at one end thereof. Extending from the shank 7 at a point substantially intermediate the ends thereof, is the eye 9, the eyes 8 and 9 being in direct alignment for the reception of the fish line, indicated by the reference character 10.

Slidably mounted on the shank 7 at a point between the eyes 8 and 9, is the sleeve 11 which is formed with an offset portion having an opening in one end thereof, in which one end of the hook 12 is secured, the hook 12 having the usual prong or barb 13 formed at one end thereof, which cooperates with the prong or barb 6 in gripping and holding a fish therebetween.

Extending from the sleeve 11 is the eye 14 which operates between the eyes 8 and 9, as clearly shown by the drawing. When connecting the fish line 10 to the hook, the line is extended through the aligning openings 8, 9 and 14, the end of the fishing line being secured to the eye 14, as at 15, the connection between the hook and fishing line being such that when movement of the hook is resisted by a fish caught and held thereon, a sudden jerk or pull on the fishing line will cause the eye members 14 and 9 to move towards each other, resulting in the barbs 6 and 13 becoming embedded in the fish to hold the fish.

In order that the sleeve 11 may be normally held in a position spaced from the prong or barbed end of the main hook section, an enlargement 16 is formed on the shank 7 adjacent to the eye 8, which frictionally engages the inner surface of the sleeve to set up a binding action with the sleeve. It will of course, be understood that when the line is pulled or jerked against resistance, the sleeve will become disengaged from the enlargement and the sleeve released for sliding movement on the shank 7.

From the foregoing it will be seen that due to the construction shown and described, I have provided a fishing hook embodying a main hook section and an auxiliary hook section slideable with respect to the main section, the hook being connected to a fishing line in such a way that a pull or jerk on the fishing line will operate to move the auxiliary hook into the fish which is caught on the prong or barb of the main hook section, thereby securely holding the fish on the hook.

Having thus described the invention, what is claimed is:

1. A fish hook embodying a main hook member having an elongated shank, an eye member extending laterally from one end of the shank, a prong extending laterally from the opposite end of the shank, an eye member extending from the shank intermediate the ends of the shank, a sleeve slidable on the shank between said eye members, an eye member extending laterally from the sleeve, a fishing line extended through the eye members with one end of the fishing line connected to the eye member of said sleeve, said fishing line effecting movement of the sleeve in one direction when the line is pulled, and a hook secured to said sleeve and movable towards the prong of the main hook member in gripping a fish.

2. A fish hook embodying a main hook member including a shank having an eye member extended from one end and a prong at the other end, an eye member extending outwardly from said shank at a point intermediate the ends of the shank, a sleeve slidable on the shank between said eye members, an eye member extending outwardly from the sleeve, a fishing line extended through the eye members, one end of the fishing line being connected with the eye member extending from said sleeve, a hook secured to said sleeve and disposed towards the prong of the main hook member for cooperating with the prong of the main hook member in gripping a fish, and means for normally holding the sleeve at a point adjacent to the eye members extended from one end of said shank.

JOHN S. GARNER.

References Cited in the file of this patent

UNITED STATES PATENTS

| Number | Name | Date |
|---|---|---|
| 1,604,031 | Ferguson | Oct. 19, 1926 |
| 1,604,725 | Sprangel | Oct. 26, 1926 |
| 2,619,759 | Penninger | Oct. 28, 1949 |